United States Patent
Hess et al.

(10) Patent No.: US 11,639,770 B2
(45) Date of Patent: May 2, 2023

(54) PROGRESSIVE DISTRIBUTOR

(71) Applicant: SKF LUBRICATION SYSTEMS GERMANY GMBH, Walldorf (DE)

(72) Inventors: Dieter Hess, Ludwigshafen (DE); Juergen Kreutzkaemper, Waibstadt-Daisbach (DE); Markus Mandera, Leimen (DE); Andreas Schoenfeld, Sankt Leon-Rot (DE); Stefan Schuermann, Walldorf (DE); Dennis Zahn, Karlsdorf-Neuthard (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 74 days.

(21) Appl. No.: 17/473,168

(22) Filed: Sep. 13, 2021

(65) Prior Publication Data
US 2022/0107053 A1 Apr. 7, 2022

(30) Foreign Application Priority Data

Oct. 6, 2020 (DE) .......................... 102020126055.5

(51) Int. Cl.
*F16N 25/02* (2006.01)
*F16N 25/04* (2006.01)
(52) U.S. Cl.
CPC .................................. *F16N 25/04* (2013.01)
(58) Field of Classification Search
CPC ........... F16N 25/00; F16N 25/02; F16N 25/04
See application file for complete search history.

(56) References Cited

U.S. PATENT DOCUMENTS

| | | | | |
|---|---|---|---|---|
| 2,792,911 A * | 5/1957 | Harter | ..................... | F16N 25/02 184/7.4 |
| 3,086,614 A * | 4/1963 | Sensui | ..................... | F16N 25/02 184/7.4 |
| 3,219,146 A * | 11/1965 | Leese | ..................... | F16N 25/02 184/6 |
| 3,229,786 A * | 1/1966 | Robson | ................... | F16N 25/02 184/7.4 |
| 3,337,003 A * | 8/1967 | Acker | ..................... | F16N 25/02 184/7.4 |
| 3,414,085 A * | 12/1968 | Fujita | ..................... | F16N 25/02 184/7.4 |

(Continued)

FOREIGN PATENT DOCUMENTS

| | | |
|---|---|---|
| CN | 107869646 A | 4/2018 |
| DE | 2917863 A1 | 11/1980 |
| DE | 202018106607 U1 | 12/2018 |

*Primary Examiner* — Michael A Riegelman
(74) *Attorney, Agent, or Firm* — J-Tek Law PLLC; Scott T. Wakeman; Mark A. Ussai

(57) ABSTRACT

A progressive distributor includes a housing block with an inlet bore and outlet bores and first and second metering pistons in first and second piston bores. Each piston defines first and second annular workspaces and delimits first and second metering spaces at the ends of each piston, the first and second piston bores each having a central axis and being disposed one atop the other so that their central axes are parallel to each other and located in a central plane. Switching bores connect the metering spaces of the first metering piston to the workspaces of the second metering piston, and the switching bores are located on opposite sides of the central plane.

10 Claims, 5 Drawing Sheets

(56) References Cited

U.S. PATENT DOCUMENTS

| | | | | | |
|---|---|---|---|---|---|
| 3,459,278 | A | * | 8/1969 | Callahan | F16N 25/02 184/6 |
| 3,783,973 | A | * | 1/1974 | Kurten | F16N 25/02 184/7.4 |
| 4,044,924 | A | * | 8/1977 | Saretzky | F16N 13/22 184/7.4 |
| 4,180,090 | A | * | 12/1979 | Bemba | F16N 25/02 184/7.4 |
| 4,364,452 | A | * | 12/1982 | Crago | F16N 29/04 184/7.4 |
| 4,572,331 | A | * | 2/1986 | Powell | F16N 25/02 184/7.4 |
| 4,609,073 | A | * | 9/1986 | Knaebel | F16N 25/02 417/349 |
| 4,712,649 | A | * | 12/1987 | Saam | F16N 25/02 137/119.06 |
| 4,921,072 | A | * | 5/1990 | Divisi | F16N 25/02 137/119.06 |
| 5,497,852 | A | * | 3/1996 | Little | F16N 25/02 184/29 |
| 8,939,176 | B2 | * | 1/2015 | Klaphake | F16K 31/363 184/7.4 |
| 8,960,236 | B2 | * | 2/2015 | Klaphake | F16K 11/10 184/7.4 |
| 9,151,444 | B2 | * | 10/2015 | Powell | F16N 25/02 |
| 2005/0163626 | A1 | * | 7/2005 | Paluncic | F16N 25/02 417/244 |
| 2013/0118835 | A1 | * | 5/2013 | Schmitt | F16N 25/02 184/6 |
| 2014/0090929 | A1 | * | 4/2014 | Powell | F16N 29/04 184/6 |
| 2020/0318658 | A1 | * | 10/2020 | Hess | F04B 9/105 |
| 2021/0317949 | A1 | * | 10/2021 | Hess | F16N 13/22 |
| 2022/0107053 | A1 | * | 4/2022 | Hess | F16N 25/04 |

* cited by examiner

PROGRESSIVE DISTRIBUTOR

CROSS-REFERENCE

This application claims priority to German patent application no. 10 2020 126 055.5 filed on Oct. 6, 2020, the contents of which are fully incorporated herein by reference.

TECHNOLOGICAL FIELD

The present disclosure is directed to an improved progressive distributor.

BACKGROUND

A progressive distributor or a progressive lubricant system serves to divide a lubricant provided by a pump into a plurality of parts and to supply a number of lubrication points (sometimes referred to as "consumers") with lubricant. An important type of progressive distributor is referred to as a "block distributor." In such progressive distributors a steel block (housing) forms a base that is machined and into which pistons are inserted that distribute the lubricant. For this purpose bores are provided in the housing block, and metering pistons are inserted into these bores, which bores are in turn supplied with lubricant via a common lubricant inlet bore.

Here each metering piston provides lubricant via respective outlets to two lubrication points/consumers. Furthermore, the quantity of the lubricant that is measured out by each metering piston is identical for each metering piston and cannot be varied. Progressive distributors require in particular that the metering pistons are successively displaced from a first position into a second position in order to either dispense the lubricant at the lubricant outlet or apply an appropriate pressure to the metering piston in order to displace it from a first position into a second position. In other words, a respective metering piston can only move if the metering piston disposed before it in the sequence of the metering piston has already moved. For this reason connecting bores are provided that connect the last metering piston in the sequence to the first metering piston, so that the first metering piston moves back after the last metering piston moves.

In order to connect the first and last metering piston to each other, the connecting bores must pass through the entire progressive distributor and are therefore relatively long. These connecting bores thus usually contain more lubricant or have a greater volume than one metering piston stroke or than a volume that is moved by a piston stroke. This causes the lubricant in these connecting bores to be moved back and forth instead of being exchanged and replaced by new lubricant. This is problematic in particular for lubricating grease that hardens as it ages and thus can clog the connecting bores. This can lead to a higher pressure, an increased oil separation from the lubricating grease, and ultimately to a failure of the progressive distributor. Furthermore, the bore holes can contain air. This air is easily compressible and leads to inaccuracies in the measured quantity of lubricant. In addition, these long connecting bores are difficult to produce, in particular in progressive distributors that include a plurality of metering pistons.

SUMMARY

It is therefore an aspect of the present disclosure to provide a progressive distributor in which, compared to conventional progressive distributors, the lubricant is more easily exchangeable in all connecting bores of the progressive distributor.

In the following a progressive distributor including a housing block for lubricant is described, wherein the housing block includes a lubricant inlet bore via which lubricant is introducible into the progressive distributor and a plurality of lubricant outlet bores via which a respective measured lubricant amount is dispensable to a consumer connected to the respective lubricant outlet bore. At least two metering pistons are provided for dispensing the measured quantity of lubricant, which metering pistons are received in associated piston bores, and each metering piston is configured such that it defines with the piston bore two annular spaces that are configured as workspaces for the lubricant. Each workspace can in turn be fluidically connected to a lubricant outlet bore. Furthermore, at the ends of the piston bore two metering spaces are respectively provided for the axial displacement of the metering piston in the piston bore, wherein furthermore the at least two piston bores are disposed along a first axis perpendicularly one-atop-the-other, so that the central axes are parallel to each other and define a central plane.

In order to connect the two metering pistons to each other such that an exchange of the lubricant located in the connection is possible, a first and a second switching bore are provided that each fluidically connect a workspace and a metering space, wherein the first switching bore is laterally offset on a first side of the central plane, and the second switching bore is laterally offset on the second side of the central plane.

In other words, the workspaces and the metering spaces can be connected via the switching bores such that the switching bores extend obliquely from the first metering piston to the second metering piston, but do not intersect or cross, since each is disposed on one side of the central plane. The switching bores can thereby be made shorter, whereby the lubricant in the switching bores can more easily be exchanged, and a manufacture of the switching bores is simplified.

A central axis of a respective switching bore preferably extends parallel to the central plane. Alternatively a central axis of a respective switching bore can be disposed such that it does not intersect the central plane between its associated metering space and its associated workspace. This can prevent the switching bores from crossing and the pistons from being switched over.

According to one preferred embodiment, the first switching bore connects a first workspace of the first piston to a second metering space of the second piston, and the second switching bore connects a second workspace of the first piston to the first metering space of the second piston. This allows the movement of the first piston to enable a subsequent movement of the second piston and thereby a switching-over from the first piston to the second piston.

A volume of a respective switching bore is preferably smaller than a volume that is moved or movable by a piston stroke. This ensures that the lubricant contained in the switching bores is completely exchanged when the associated piston is actuated. The smaller volume in the switching bore and the complete lubricant exchange associated therewith can in particular improve a bleed behavior of lubricant so that even lubricating grease can be used as lubricant in progressive distributors. For example, the volume of the switching bore can be half as large as the volume of the workspace.

According to one preferred embodiment, the piston bore is a through-bore extending through the housing, and is closable in a fluid-tight manner on both sides respectively via a closure flap releasably connectable to the housing but closing in a fluid-tight manner, and, together with the closure flap, the piston bore defines the metering space. In particular, a cavity can be provided in the closure cap. It can thereby be ensured that the metering piston has sufficient space for its stroke.

A diameter of the piston bore in the region of the metering spaces is preferably as much larger as the lateral offset by which one of the switching bores is laterally offset from the central plane. This has the advantage in particular that the switching bore can be disposed in the region of the metering space that is larger in comparison to the piston bore. It can thereby advantageously be ensured that the lateral offset of the switching bore is sufficiently large.

According to a further preferred embodiment, an auxiliary bore is provided that fluidically connects the workspace and the switching bore. In other words, the switching bore extends almost to the workspace, and the auxiliary bore connects the switching bore to the workspace. This can in particular increase the accuracy by which the switching bore is connected to the workspace. Furthermore, the manufacture of the switching bore can thereby be simplified. The auxiliary bore preferably extends perpendicular to the central plane from one side of the housing to the workspace, wherein the auxiliary bore is closable outward in a fluid-tight manner via a closure cap closing in a fluid-tight manner. Here the auxiliary bore can preferably be shorter than the switching bore. Shorter and/or straight-extending bores can be embodied with a higher accuracy. Furthermore, because the auxiliary bore extends perpendicular to the central plane from one side of the housing to the workspace, an oblique entry angle of the switching bore into the workspace can be prevented. This furthermore has the advantage that the resulting connecting hole between the workspace and the switching bore is smaller.

According to a further preferred embodiment, the progressive distributor includes at least two further metering pistons that are received in associated piston bores, wherein the two metering pistons and the at least two further metering pistons are disposed in two layers lying one atop the other such that at least one metering piston and at least one further metering piston are disposed in each layer. This arrangement in two layers lying one atop the other allows the connecting bores and/or the switching bores to be kept short, whereby the lubricant in the connecting bores and/or the switching bores can be exchanged more quickly.

According to a further preferred embodiment, a blind piston is disposed in at least one of the piston bores that permanently closes both the lubricant inlet bore and both lubricant outlet bores and includes at least one bypass connection that fluidically connects two of the connecting bores to each other in order to divert lubricant past the blind piston into the connecting bores leading to the next piston bore. This makes it possible to provide a modular progressive distributor.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
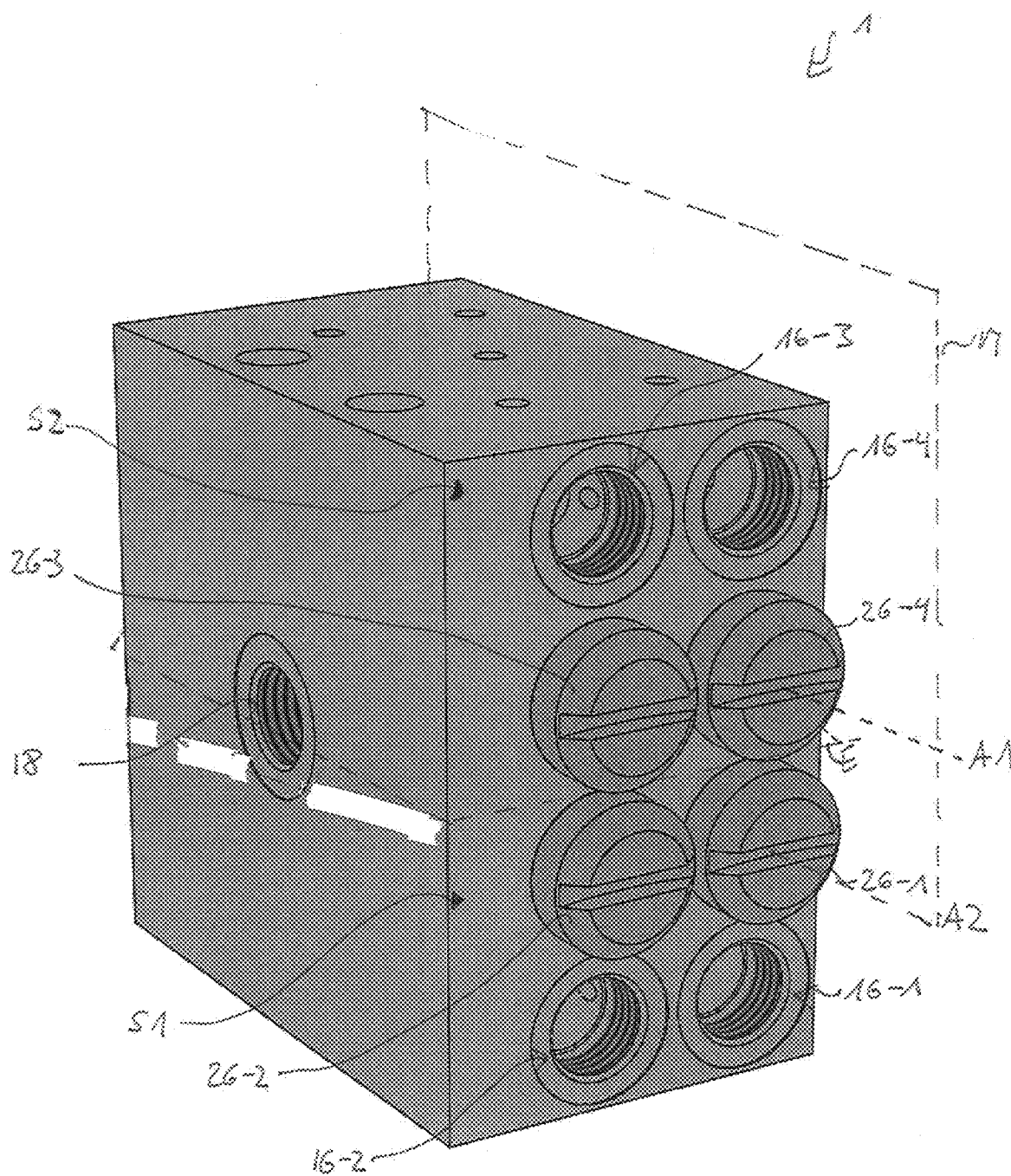
FIG. 1 shows a perspective view of an exemplary embodiment of a progressive distributor according to an embodiment of the present disclosure.

FIG. 1 shows a perspective view of a progressive distributor 1 in block construction. For this purpose the progressive distributor 1 includes a housing block 2 into which a plurality of bores are introduced. As can be seen from the sectional views of FIGS. 2, and 3, the housing block 2 includes piston bores in which metering pistons are receivable.

The progressive distributor 1 includes in particular four piston bores 4-1, 4-2, 4-3, 4-4 that are disposed pairwise one atop the other in two rows or layers S1, S2. That is, the piston bore 4-4 is disposed over the piston bore 4-1, and the piston bore 4-3 is disposed over the piston bore 4-2, wherein the piston bore 4-1 is disposed adjacent to the piston bore 4-2, and the piston bore 4-3 is disposed adjacent to the piston bore 4-4. Alternatively the progressive distributor can also include only two piston bores 4 or also more than four, for example, up to 20 piston bores. In FIG. 1, these four piston bores 4-1, 4-2, 4-3, 4-4 are located behind respective closure caps 26-1, 26-2, 26-3, 26-4 that seal the piston bores 4-1, 4-2, 4-3, 4-4 in a fluid-tight manner.

The piston bores 4 themselves each have a central axis A, wherein the central axes A of two piston bores 4 disposed one atop the other have a respective central plane M and a plane E standing perpendicular to M. The plane E thus separates the layers S1, S2 from each other.

Figure 2:
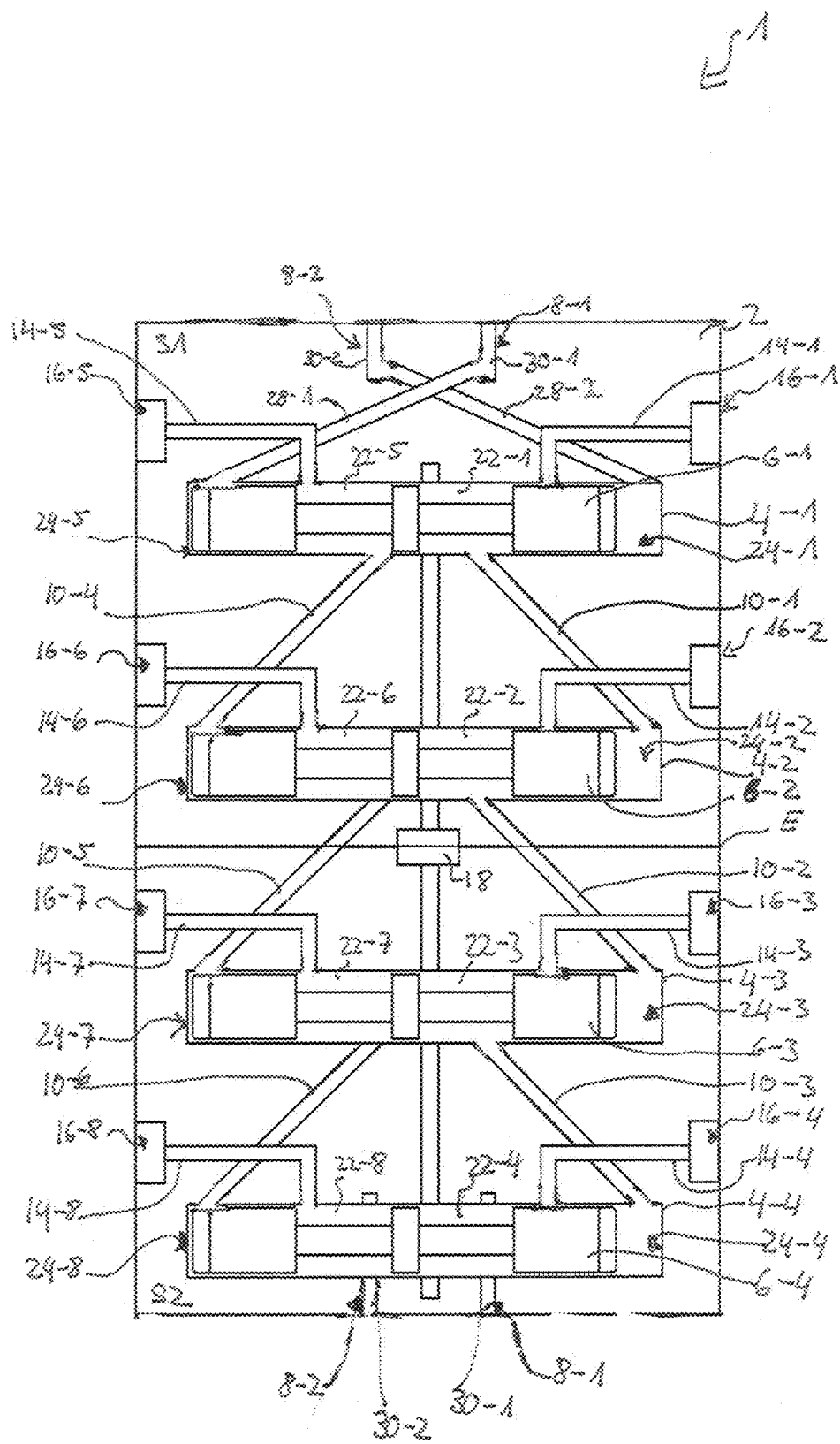
FIG. 2 is a plan view of the progressive distributor of FIG. 1 cut at plane E and folded open to show four piston bores inside the distributor.
Figure 3:
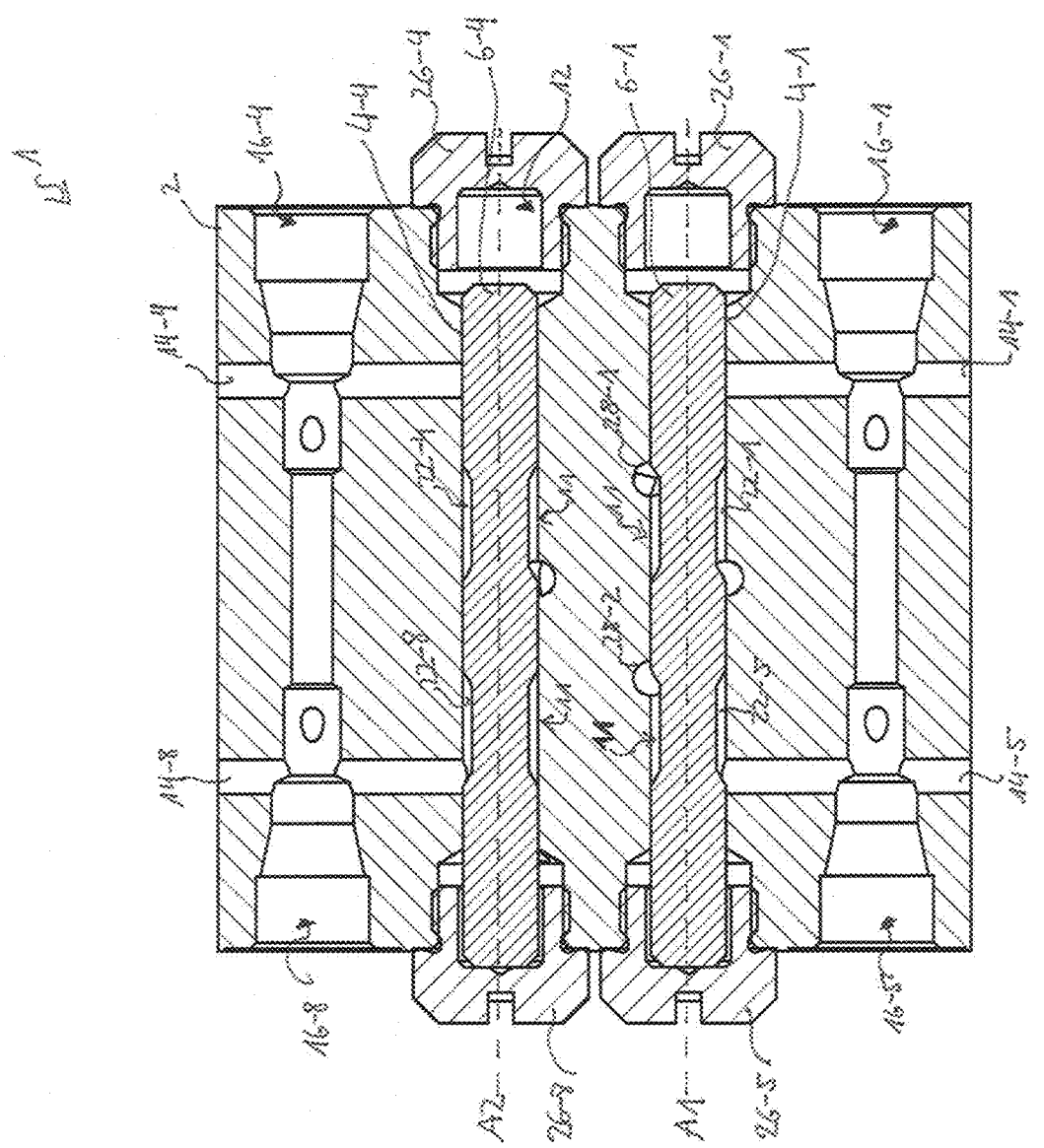
FIG. 3 is a schematic sectional view through the progressive distributor from FIG. 1.

FIG. 2 shows a schematic view wherein the two layers in which the piston bores are disposed are folded apart at plane E and shown next to each other. This means that the auxiliary bores 30-1, 30-2 of the switching bores 8-1, 8-2, which are depicted in FIG. 2 at the upper and lower edge, merge into each other. FIG. 3 shows a view wherein the progressive distributor 1 is cut along the plane M. As can be seen more precisely in FIG. 2, among one another the piston bores 4 are connected to one another via connecting bores 10. Lubricant is guided via these connecting bores 10 from one piston bore 4 to another piston bore 4, or via lubricant outlet bores 14 (FIGS. 2 and 3) to a lubricant outlet 16.

In the depicted exemplary embodiment of the progressive distributor 1, lubricant can be guided via the connecting bores 10-1, 10-2, 10-3, 10-4, 10-5, 10-6 between the piston bores 4-1, 4-2, 4-3 and 4-4 or to the associated lubricant outlets 14 (see FIGS. 2 and 3). Thus, for example, in an operating state of the progressive distributor 1, lubricant can be transferred from the piston bore 4-1 via the connecting bore 10-1 into the piston bore 4-2, and from there via the connecting bore 10-2 into the piston bore 4-3. From there the lubricant can then be transferred via the workspace 22-1, configured as annular space 11, into the lubricant outlet bore 14-1 and into the lubricant outlet 16-1.

As can be seen in particular in FIGS. 2 and 3, each metering piston 6 is displaceably disposed in the piston bore 4 and can alternatively release one of the lubricant outlet bores associated with the respective metering piston, for example, 14-1 or 14-5. Furthermore, the housing includes a lubricant inlet bore 18, via which lubricant is provided to the individual piston bores 4.

Since the principal functioning of a progressive distributor is known and is not changed, an explanation of the functioning and how the metering piston 6 is displaced is omitted. However, since progressive distributors 1 are based on the fact that the metering pistons 6 are successively displaced from a first position into a second position in order to either dispense the lubricant at the lubricant outlet 16 or to act upon the metering piston 6 with corresponding pressure in order to displace it from a first position into a second position, the first and last piston bore 4-1 and 4-4 must also be connected to each other. In known progressive distributors, the connecting bores that connect the first and last piston bore to each other pass through the entire progressive distributor and are therefore relatively long.

This causes these connecting bores to usually contain more lubricant or have a greater volume than one metering piston stroke or than a volume that is moved by a piston stroke. The lubricant in these connecting bores is thereby only moved back and forth, which causes the lubricant in the connecting bores to not be exchanged and replaced by new lubricant.

Figure 5:
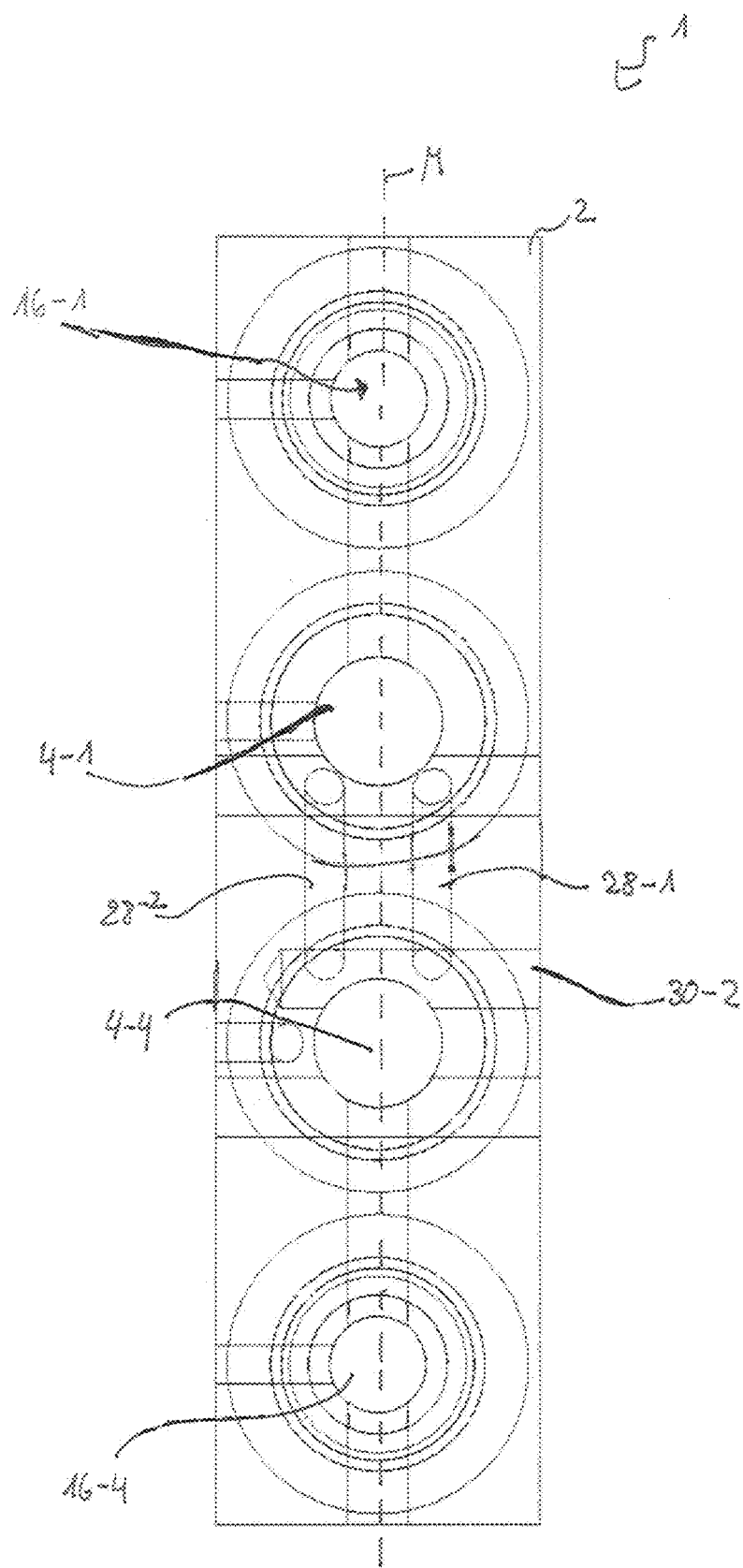
FIG. 5 is a schematic view of the progressive distributor of FIG. 1 along a central axis of a piston bore.

In order to connect the two piston bores 4-1 and 4-4 to each other such that a complete-as-possible exchange of the lubricant located in the connection will occur, a first and a second switching bore 8-1 and 8-2 (FIG. 2) are provided that each fluidically connect a workspace 22 and a metering space 24. As can be seen in FIG. 5, here the first switching bore 8-1 is disposed laterally offset on a first side of the central plane M, and the second switching bore is disposed laterally offset on the second side of the central plane M. Furthermore, each workspace 22 can be fluidically connected to a lubricant outlet bore 14.

In other words, the working spaces 22-4, 22-8 and the metering spaces 24-1, 24-5 are connected via the switching bores 8-1, 8-2 such that the switching bores 8-1, 8-2 extend obliquely from the first piston bore 4-1 to the second piston bore 4-4, but do not intersect or cross, since each is disposed on one side of the central plane M. In the exemplary embodiment shown in FIGS. 1 to 5, a central axis with respect to a respective switching bore 8-1, 8-2 extends parallel to the central plane M. Alternatively, the central axes of the switching bores 8-1, 8-2 can extend such that they do not intersect the central plane M between their associated metering space 24-1, 24-5 their associated workspace 22-4, 22-8.

Figure 4:
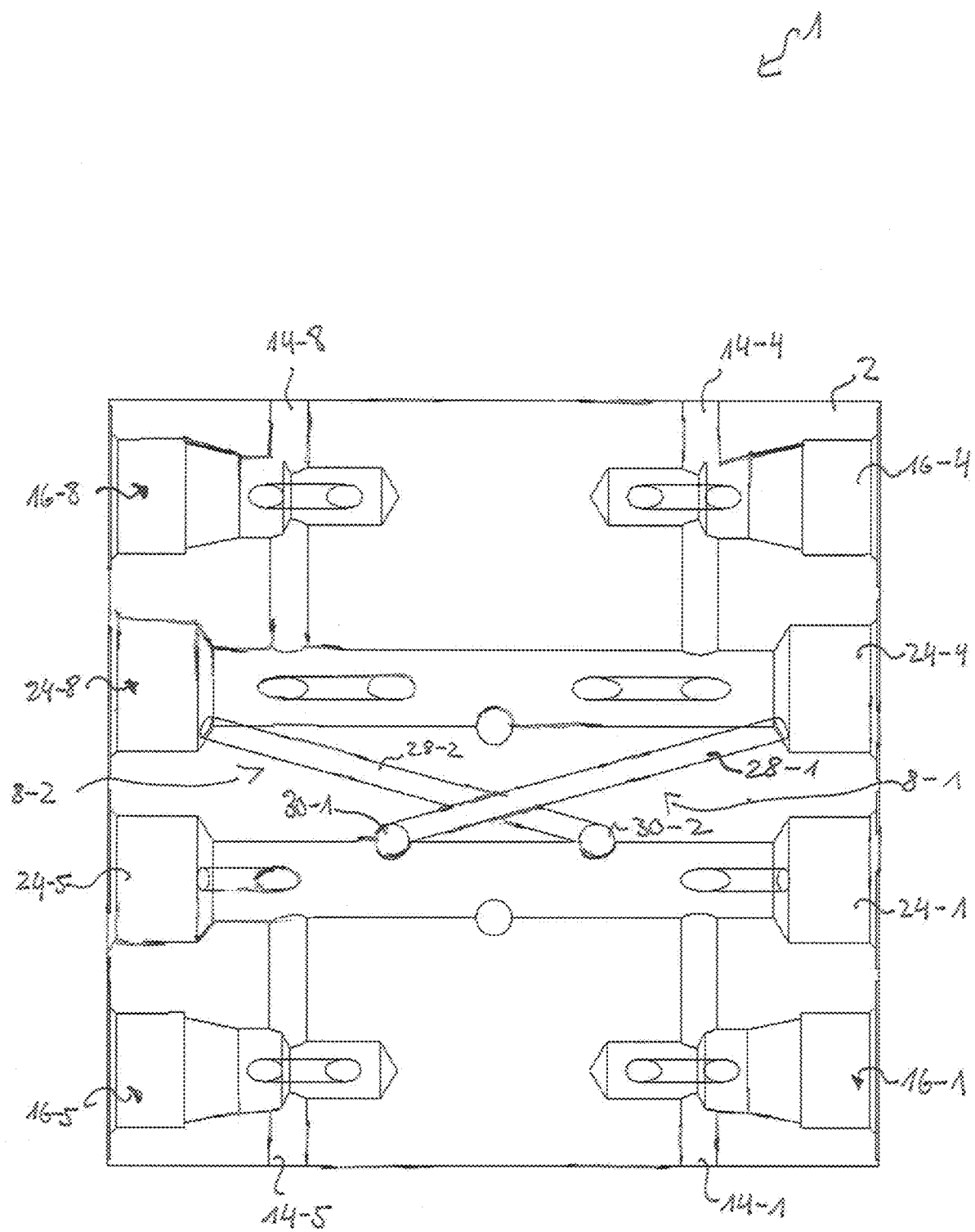
FIG. 4 is a schematic view of the progressive distributor of FIG. 1 along a central axis of an auxiliary bore.

As can be seen in FIGS. 2, 4, and 5, the switching bores 8-1, 8-2 have an obliquely extending bore 28-1, 28-2, and an auxiliary bore 30-1, 30-2 that fluidically connects the workspace 22-4, 22-8 and the obliquely extending bore 28-1, 28-2. That is, the obliquely extending bore 28-1, 28-2 extends almost up to the workspace 22-4, 22-8, and the auxiliary bore 30-1, 30-2 connects the bore 28-1, 28-2 to the workspace 22-4, 22-8. This can in particular increase the accuracy by which the switching bore 8-1, 8-2 is connected to the workspace 22-4, 22-8.

Here the auxiliary bore 30-1, 30-2 can be bored, for example, perpendicular to the central plane M from one side of the housing block 2 to the workspace 22-4, 22-8. The auxiliary bore 30-1, 30-2 can be closable outward in a fluid-tight manner via a closure cap (not depicted) closing fluid-tight, such as, for example, by being sealing off with a ball, or a blockage. The switching bores 8-1, 8-2 can thereby be designed shorter, whereby the lubricant in the switching bores 8-1, 8-2 can be more easily exchanged, and a manufacturing of the switching bores 8-1, 8-2 is simplified. For example, the volume of a switching bore 8-1, 8-2 can be smaller than the volume that is moved by a piston stroke, for example, half as large.

As can be seen in FIG. 3, the closure cap 26 includes a cavity 12, which together with the piston bore 4 defines the metering space 24, so that it is ensured that the metering piston 6 has sufficient space for its stroke. Furthermore, the piston bores 4 are designed larger in diameter in the region of the metering spaces 24. Here the diameter of the metering space 24 is larger by as much as the lateral offset by which one of the switching bores 8 is disposed laterally displaced from the central plane M.

Overall, with the disclosed progressive distributor there is the possibility to make the switching bores shorter, whereby the lubricant in the switching bores can be more easily exchanged. Due to the arrangement of the piston bores one atop the other, it is also possible to simplify the manufacturing of the switching bores, since a complex boring through the entire housing block can be omitted.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved progressive distributors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Progressive distributor
2 Housing block
4 Piston bore
6 Metering piston

8 Switching bore
10 Connecting bore
11 Annular space
12 Cavity
14 Lubricant outlet bore
16 Lubricant outlet
18 Lubricant inlet bore
20 Inner bore
22 Workspace
24 Metering space
26 Closure cap
28 Oblique bore
30 Auxiliary bore
A Central axis
E Plane
M Central plane
S Layer

What is claimed is:

1. A progressive distributor for lubricant comprising:
a housing block including a lubricant inlet bore via which lubricant is introducible into the progressive distributor,
a plurality of lubricant outlet bores, via which a metered quantity of lubricant is dispensable to a consumer connected to the respective lubricant outlet bore,
a first metering piston mounted in a first piston bore in the housing and a second metering piston mounted in a second piston bore in the housing, each of the first and second metering pistons defining with the respective first and second piston bores a first annular workspace and a second annular workspace for the lubricant, the first and second piston bores each including a first metering space and a second metering space at opposite ends of the respective first and second piston bores to allow axial displacement of the first and second pistons, the first and second piston bores each having a central axis and being disposed one atop the other so that the central axes are parallel to each other and located in a central plane,
a first switching bore connecting the first metering space of the first piston bore to the second annular workspace of the second metering bore, and
a second switching bore connecting the second metering space of the first piston bore to the first annular workspace of the second metering bore,
wherein the first switching bore is located on a first side of the central plane, and the second switching bore is located on the second side of the central plane.

2. The progressive distributor according to claim 1, wherein a central axis of each of the first and second switching bores is parallel to the central plane.

3. The progressive distributor according to claim 1, wherein a portion of the central axis of the first switching bore between the first metering space of the first piston bore and the second annular workspace of the second piston bore does not intersect the central plane, and
wherein a portion of the central axis of the second switching bore between the second metering space of the first piston bore to the first annular workspace of the second piston bore does not intersect the central plane.

4. The progressive distributor according to claim 3, wherein a volume of each switching bore is smaller than a volume of the lubricant that is moved by a piston stroke.

5. The progressive distributor according to claim 1, wherein the piston bore is a through-bore extending through the housing and is closed in a fluid-tight manner at each end by a closure cap releasably connected to the housing, and
wherein each closure cap defines an end of the metering space.

6. The progressive distributor according to claim 5, wherein a diameter of the first piston bore in a region of the metering space is larger than an offset of the first switching bore from the central plane and larger than an offset of the second switching bore from the central plane.

7. The progressive distributor according to claim 1, including an auxiliary bore fluidically connecting the workspace of the first metering piston and the first switching bore.

8. The progressive distributor according to claim 7, wherein the auxiliary bore is perpendicular to the central plane, and
wherein the auxiliary bore is closed in a fluid-tight manner by an auxiliary closure cap.

9. The progressive distributor according to claim 1, including a third metering piston mounted in a third piston bore in the housing and a fourth metering piston mounted in a fourth piston bore in the housing,
wherein the first and second metering pistons are disposed in a first layer and the third and fourth metering pistons are disposed in a second layer above the first layer.

10. The progressive distributor according to claim 1, wherein a volume of each switching bore is smaller than a volume of the lubricant that is moved by a piston stroke.

* * * * *